I. M. PEARSON.
VEHICLE WHEEL.
APPLICATION FILED DEC. 2, 1912.
1,121,757.
Patented Dec. 22, 1914.
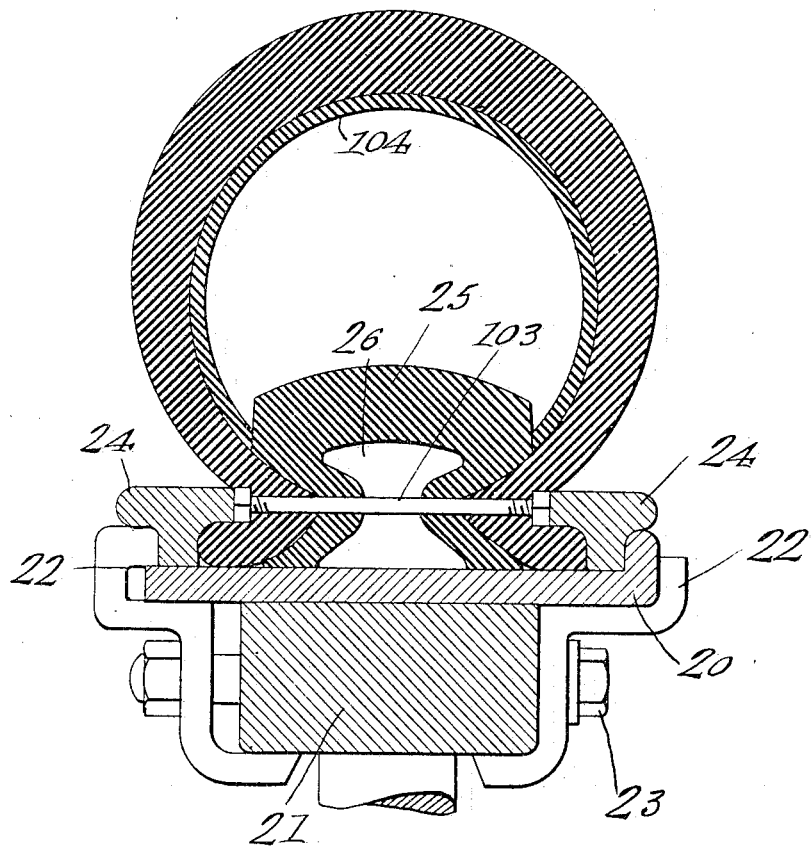
Witnesses
Ida M. Pearson
Inventor
by C.A. Snow & Co.
Attorneys

UNITED STATES PATENT OFFICE.

IDA M. PEARSON, OF ALLENTOWN, PENNSYLVANIA, ASSIGNOR TO ROBERT D. PEARSON, OF BETHLEHEM, PENNSYLVANIA.

VEHICLE-WHEEL.

1,121,757.  Specification of Letters Patent.  Patented Dec. 22, 1914.

Application filed December 2, 1912. Serial No. 734,607.

*To all whom it may concern:*

Be it known that I, IDA M. PEARSON, a citizen of the United States, residing at Allentown, in the county of Lehigh and State of Pennsylvania, have invented a new and useful Vehicle-Wheel, of which the following is a specification.

The device forming the subject matter of this application is a fastening means for attaching a tire to a rim and the invention aims to provide a fastening means the constituent parts of which coact to maintain a filler in such a place that it may coact with the securing rings which lie upon opposite sides of the tire, the device being intended, primarily, for use in cases of emergency, when the tire has become deflated, the construction being such that a deflated tire may be run for a limited period of time without serious damage.

The drawings show typical embodiments merely, and changes properly falling within the scope of what is claimed may be made without departing from the spirit of the invention.

The invention is disclosed in a single cross sectional figure.

The rim is denoted by the numeral 20 and is held upon the felly 21 by means of clamps 22 which engage the edges of the rim 20, securing bolt 23 being passed through the clamps 22 and through the felly 21. The tire-holding elements 24 are of T-shape. One tire-holding element is retained by a flange upon one edge of the rim 20, the other tire-holding element being retained by the curved end of one of the clamps 22. The support 25 is in the form of an inverted trough, having a central air chamber 26, the support being recessed along its lateral faces to receive the clencher beads of the tire. Through the support 25 and through the tire may be passed securing bolts 103, and the inner face of the tire may be coated with a lining 104, of any desired sort, the coating, if desired, being applied in liquid form. The compressible filler 25 which coöperates with the rim is provided with grooves in its outer faces. The tire is provided with ribs which enter the grooves and has grooves in its outer faces, which grooves receive the ribs on the securing strips 24. The ends of the bolt 103 lie in the grooves in the outer faces of the tire and are engaged by the ribs on the strips 24. The construction is such that the filler 25 is held in proper shape. It is to be observed in this connection, that the filler 25 outstands beyond the rings or securing strips 24. When the tire is deflated, the same may be operated in cases of emergency, the filler and the securing strips operating to prevent a cutting of the tire when the same is deflated.

Having thus described the invention, what is claimed is:—

In a tire fastening means, a rim; a compressible filler coöperating with the rim and having grooves in its outer faces; a tire having ribs which enter the grooves, and provided with grooves in its outer faces; a securing device passing through the filler and the tire and having its ends located in the grooves of the tire; securing strips including ribs which enter the grooves of the tire and house the ends of the securing device; and clamping means coöperating with the strips, the ribs of the strips engaging the ends of the securing device to prevent an undue compression of the filler and a distortion thereof under the action of the clamping means.

In testimony that I claim the foregoing as my own, I have hereto affixed my signature in the presence of two witnesses.

IDA M. PEARSON.

Witnesses:
R. L. SCHIFFERT.
GEO. M. MOHN.

Copies of this patent may be obtained for five cents each, by addressing the "Commissioner of Patents, Washington, D. C."